United States Patent
Ginesi et al.

(10) Patent No.: US 7,061,974 B2
(45) Date of Patent: Jun. 13, 2006

(54) SYSTEM AND METHOD FOR DATA TRANSMISSION IN DMT-BASED DSL MODEMS

(75) Inventors: Alberto Ginesi, Neapen (CA); Andrew Deczky, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 845 days.

(21) Appl. No.: 10/072,615

(22) Filed: Feb. 5, 2002

(65) Prior Publication Data

US 2002/0154686 A1 Oct. 24, 2002

(30) Foreign Application Priority Data

Feb. 5, 2001 (CA) .................................... 2333829
Feb. 22, 2001 (CA) .................................... 2337737

(51) Int. Cl.
*H04B 1/38* (2006.01)

(52) U.S. Cl. ..................................... 375/222

(58) Field of Classification Search ............... 375/260, 375/261, 331, 355, 244, 226, 730, 222, 220, 375/219; 370/206, 207, 208, 212, 213, 215, 370/482
See application file for complete search history.

(56) References Cited

U.S. PATENT DOCUMENTS

| | | | |
|---|---|---|---|
| 5,732,068 A * | 3/1998 | Takahashi et al. .......... 370/206 |
| 6,097,763 A * | 8/2000 | Djokovic et al. ........... 375/260 |
| 6,118,758 A | 9/2000 | Marchok et al. | |
| 6,175,550 B1 * | 1/2001 | van Nee ..................... 370/206 |
| 6,181,714 B1 | 1/2001 | Isaksson et al. | |
| 6,449,288 B1 * | 9/2002 | Chari et al. ................. 370/470 |
| 6,611,493 B1 * | 8/2003 | Miyashita et al. .......... 370/208 |
| 2002/0006167 A1 * | 1/2002 | McFarland ................... 375/260 |

* cited by examiner

*Primary Examiner*—Emmanuel Bayard
(74) *Attorney, Agent, or Firm*—Merek, Blackmon & Voorhees, LLC

(57) ABSTRACT

Method and apparatus for improving data transmission in a digital subscriber line (DSL) system. The transmitter determines whether a spectrum of an inverse Fourier transform (IFT) is periodic with respect to a clock of a predetermined standard-size IFT and communicates this information to the receiver. Based on this information, the receiver adapts the FT if desired. In effect, the receiver adapts its signal processing algorithms to process the received signal in accordance with the transmitter's IFT size. In this manner, transmission performance is improved.

8 Claims, 4 Drawing Sheets

(a)

(b)

(a)

(b)

SYSTEM AND METHOD FOR DATA TRANSMISSION IN DMT-BASED DSL MODEMS

The present invention relates generally to DSL technology, and specifically to a method for improving data transmission in a DMT-based communication system.

BACKGROUND OF THE INVENTION

It is well known that some current modems operating in accordance with G.992.1 and G.992.2 standards implement a transmitter with an Inverse Fast Fourier Transform (IFFT) size greater than the one specified by the standards. These modems may implement the transmitter in either the upstream (US) or downstream (DS) direction, or both. There are many reasons that may influence this decision. For example, for an upstream channel the standard IFFT size is 64 points. However, an IFFT greater than 64 points may be justified for two reasons. A first reason is hardware symmetry with the downstream channel, since the downstream channel requires a larger Fast Fourier Transform (FFT). A second reason is ease of implementation of different Annexes of the G.992.1 and G.992.2 standards with the same data path.

Even though the use of a larger IFFT does not compromise interoperability between modems, their performance may be affected, particularly on short loops. Laboratory tests show that if the transmitter uses an IFFT other than that suggested by the standard on short loops, data rate penalties of approximately 25 to 30% are experienced.

Thus there is a need for a system and method for allowing the transmitter to use an IFFT having a size larger than that specified in the standard, while reducing data rate penalties. It is an object of the present invention to obviate or mitigate at least some of the above-mentioned disadvantages.

SUMMARY OF THE INVENTION

In accordance with an aspect of the present invention there is provided a system and method for improving data transmission between a transmitter and a receiver in a Discrete Multitone (DMT) based Digital Subscriber Line (DSL) system. The transmitter includes an Inverse Fourier Transform (IFT) for modulating the data and the receiver includes a Fourier Transform (FT) for demodulating the data. The transmitter determines whether or not a spectrum of the IFT output is periodic with a clock of a predefined standard-size IFT. The transmitter communicates the determination to the receiver before the data transmission begins. The receiver adapts the FT if the determined spectrum is not periodic with the clock of the predefined standard-size IFT.

BRIEF DESCRIPTION OF THE DRAWINGS

An embodiment of the invention will now be described by way of example only with reference to the following drawings in which:

FIG. 3 is a graph illustrating an output signal of the system illustrated in FIG. 1a;

FIG. 6a is a graph illustrating the spectrum of an upsampled signal from the IFFT illustrated in FIG. 1a; and FIG. 6b is a graph illustrating the spectrum of a signal from the IFFT illustrated in FIG. 1b.

DETAILED DESCRIPTION OF THE PREFERRED EMBODIMENTS

Figure 1:
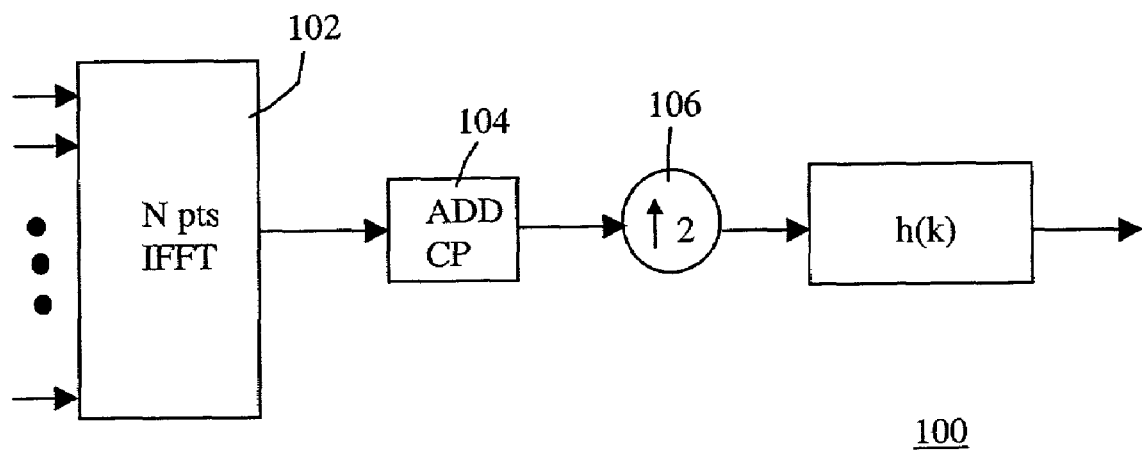
FIG. 1a is a block diagram of a transmitter using an N-point IFFT.
FIG. 1b is a block diagram of a transmitter using a 2N-point IFFT.
Figure 1:
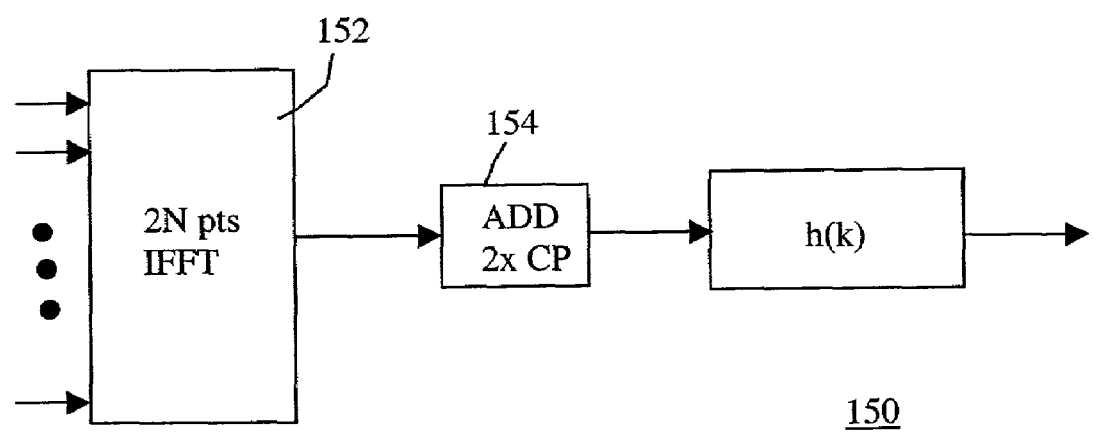

For convenience, like numerals in the description refer to like structures in the drawings. Referring to FIG. 1a, a conceptual model of a transmitter using a standard-size IFFT is illustrated generally by numeral 100. A transformer 102 is coupled to a prefix adder 104, which is coupled to an upsampler 106, which is coupled to a filter h(k). The transformer performs an N-point IFFT on N Quadrature Amplitude Modulation (QAM) per-tone symbols, transforming the symbols into the time domain for transmission. Before the symbols are transmitted, the prefix adder 104 adds a cyclic prefix CP for providing a "guard time" for the symbols. The filter h(k) represents channel and transmit front end filters, merged into one filter for illustrative purposes. The filter's impulse response is sampled at a sampling frequency twice that of transformer's frequency. Therefore, the upsampler 106 is required for upsampling the output of the prefix adder 104 to the sampling frequency of the filter h(k).

Referring to FIG. 1b, a conceptual model of transmitter using a doubled-size IFFT is illustrated generally by numeral 150. Similarly to the system illustrated in FIG. 1a, transformer 152 is coupled to a prefix adder 154, which is coupled to a filter h(k). The transformer 152 performs a 2N-point IFFT on 2N received DMT symbols, transforming the symbols into the time domain for transmission. Before the symbols are transmitted, the prefix adder 154 adds a cyclic prefix CP. Since the transformer has operated on 2N QAM symbols, the prefix adder 154 adds a cyclic prefix that is twice the size of that described with reference to FIG. 1a. The filter h(k) is the same as that illustrated in FIG. 1a. However, the filter's impulse response is sampled at a sampling frequency that is the same as the transformer's frequency. Therefore, the upsampler 106 is not required for the present example.

While the two implementations described above, with reference to FIGS. 1a and 1b, generate the same signal while transmitting constant QAM symbols (REVERB-like DMT symbols), it can be seen that the two generated signals are different in ShowTime mode. If the IFFT is performed on a repeated spectrum, that is, a normal spectrum with bins 1 to 32 and conjugate bins from 33 to 64, and then repeated for bins 65 to 128, the corresponding time domain signal will have every second sample set to 0. If, however, the IFFT is performed on a spectrum that is not repeated, that is a spectrum with bins 1 to 32, bins 33 to 96 zeroed and conjugate bins from 97 to 128, the corresponding time domain signal will not have every second sample set to zero. Rather, the samples are defined by the IFFT. When these signals are put through the channel (here represented by the transmit filter h(k)), there is a difference in the transient response. Thus, during ShowTime when adjacent symbols contain different signals due to the modulation, the difference appears at the boundary of the symbols. The steady state response to a sine wave input is a sine wave of the same frequency with different magnitude and phase. During REVERB, a continuous sine wave is transmitted. Thus, the steady state response, after allowing the transient to die away, is another sine wave regardless of the size of the IFFT.

Figure 2:
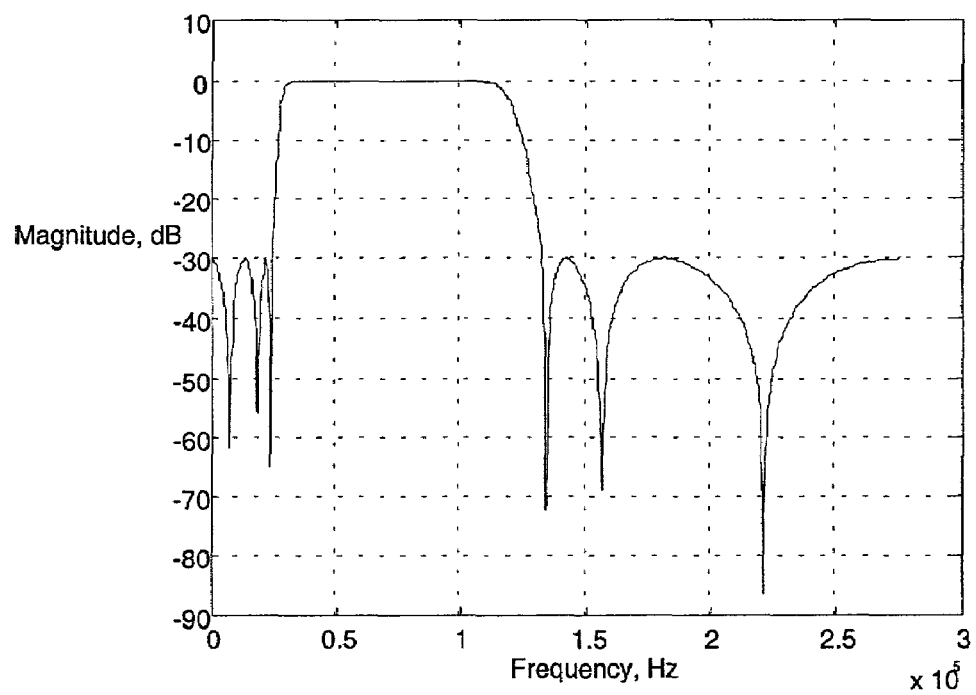
FIG. 2a is a graph illustrating the amplitude frequency response of the filter h(k)
FIG. 2b is a graph illustrating the impulse response of the filter h(k)
Figure 2:
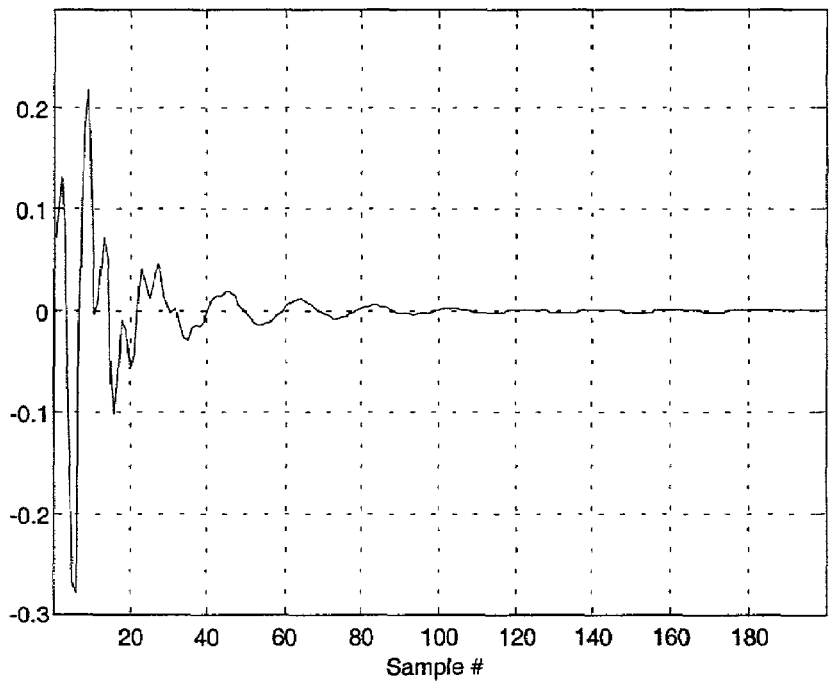

To illustrate this point, an example related to the upstream channel is described. In particular, the upstream channel has a 552 kHz sampling frequency and its frequency response and impulse response are as illustrated in FIGS. 2a and 2b, respectively. In this example, the channel has been designed as a $6^{th}$ order Chebyshev type 2 band-pass filter with 30-dB stop-band rejection. For the system as described with reference to FIG. 1a, the IFFT has 64 points and the cyclic prefix CP has 4 samples. For the system as described with reference to FIG. 1b the IFFT has 128 points and the cyclic prefix CP has 8 samples.

Figure 3:
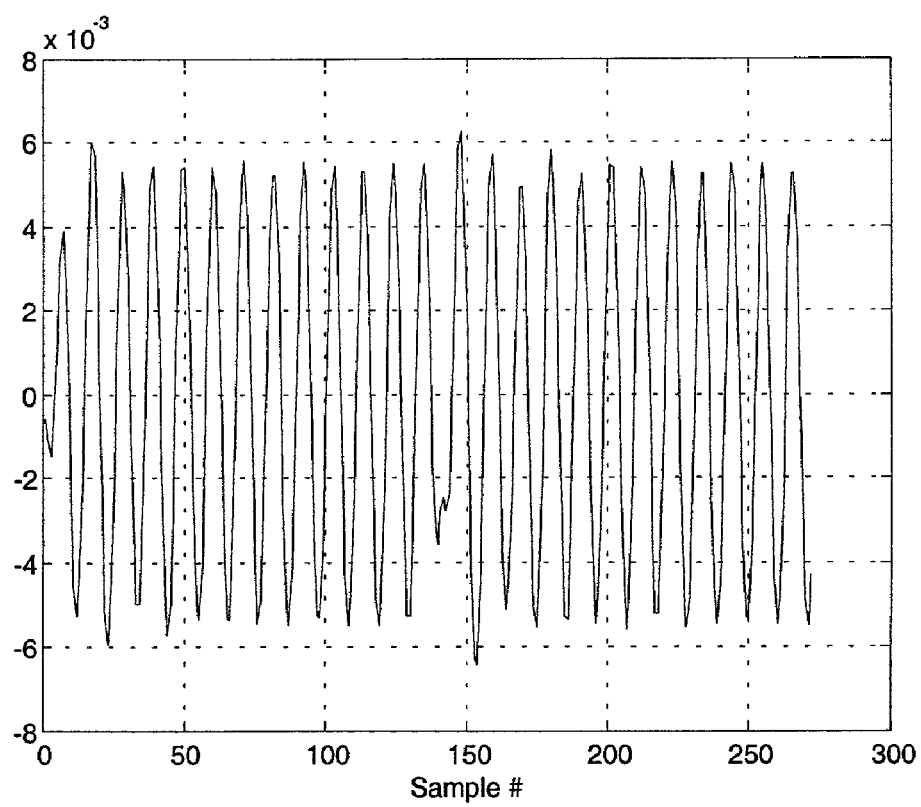
Figure 4:
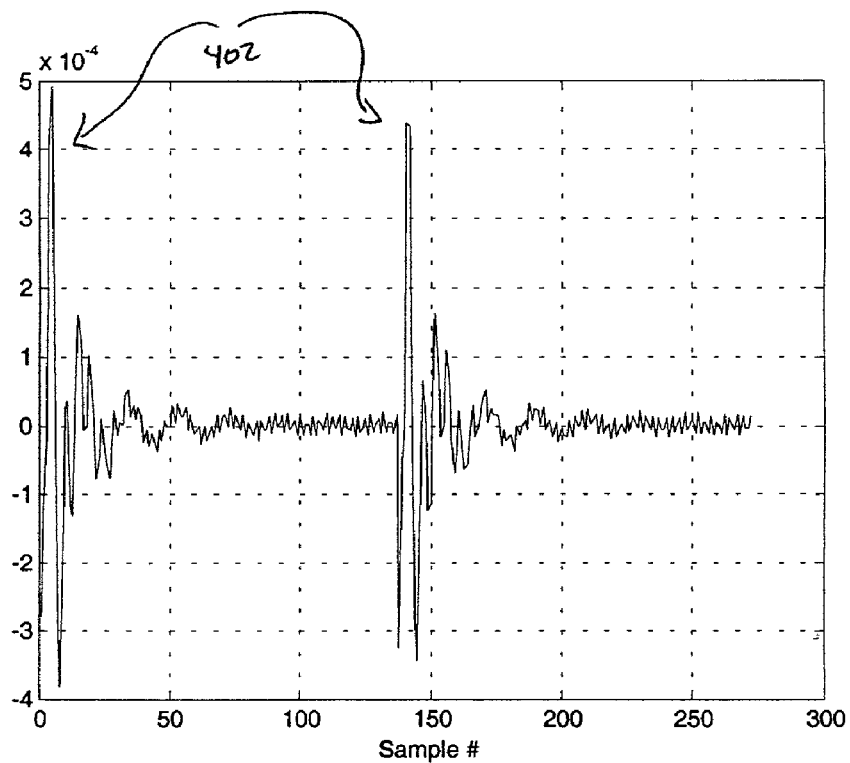
FIG. 4 is a graph illustrating a difference between output signals of the systems illustrated in FIGS. 1a and b.

For simplicity, it is assumed that only one bin, bin 12, is transmitted. Two QAM symbols, 1+j, −1-j, are transmitted using two consecutive DMT symbols. Referring to FIG. 3, the output signal of the system described with reference to FIG. 1a is illustrated. The output signal of the system described with reference to FIG. 1b is not illustrated, as it closely resembles FIG. 3. Referring to FIG. 4 the difference between the output signals of the systems described with reference to FIGS. 1a and 1b is illustrated. As illustrated, the difference between the two output if signals is small and is concentrated around the cyclic prefix CP regions 402.

Figure 5:
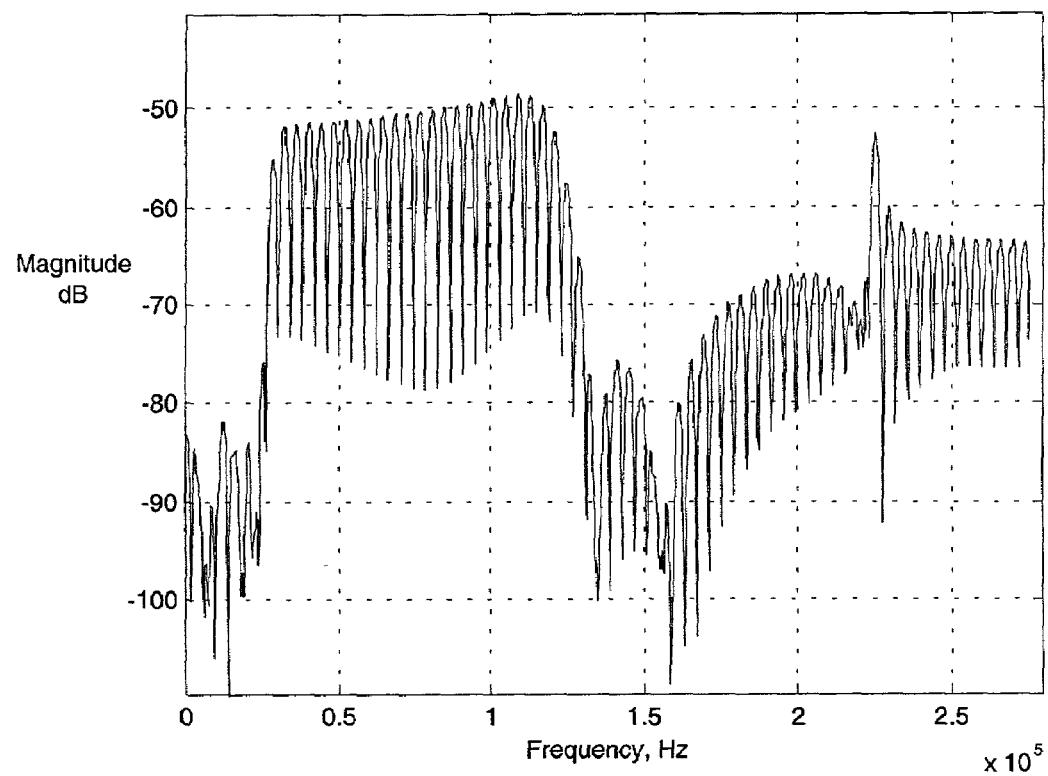
FIG. 5 is a graph illustrating the frequency content of the graph illustrated in FIG. 4.

Referring to FIG. 5 a graph illustrating the frequency content of the graph illustrated in FIG. 4 is shown. Referring once again to FIG. 1a, the filter h(k) is being sampled at a rate of 552 kHz. The 64-point IFFT operates at a frequency of 276 kHz and therefore its Nyquist frequency is 138 kHz. Therefore, one would expect any difference between output from FIGS. 1a and 1b to occur at a frequency above 138 kHz. However, it is clear from the frequency content graph that the error signal between the two systems of FIGS. 1a and 1b also includes components below 138 kHz. This difference explains the data rate penalties that are incurred.

In order to overcome these errors, information is exchanged between a modem located at a subscriber's premises (ATU-R) and a modem located at a remote terminal or central office (ATU-C). This information is exchanged during G.hs (or handshaking) in order to let the receivers know how the transmit signals are generated. Thus, the receiver can adapt its signal processing algorithms to adequately process the received signal. That is, the IFFT size information is exchanged between the transmitter and the receiver during the modem initialization. The receiver adapts its signal processing algorithms to adequately process the received signal in accordance with the transmitter's IFFT size. In particular, the FFT size and clock are matched to the IFFT size and clock. Also, a Time Domain Equalizer (TDEQ) runs at higher clock frequency consistent with the FFT clock frequency. This concept is described in greater details as follows.

Figure 6:
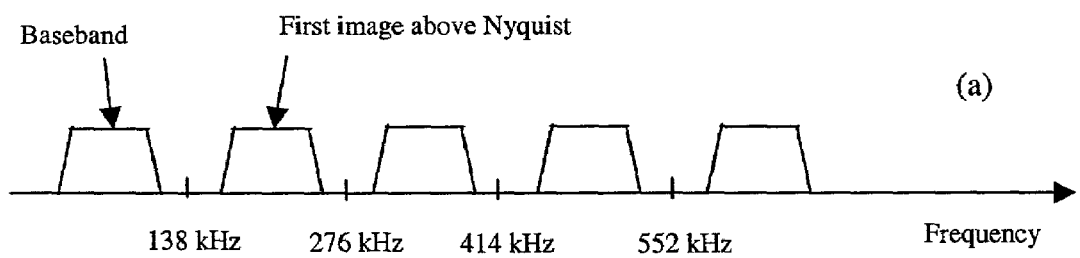
Figure 6:
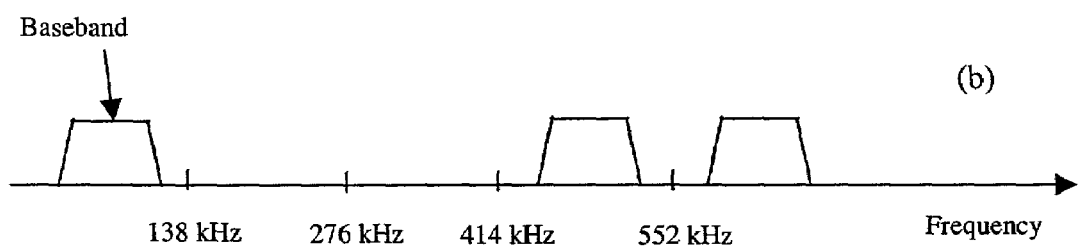

Referring to FIG. 6a, the spectrum of an upsampled signal from the 64-point IFFT illustrated in FIG. 1a is shown. As shown in the diagram there is an image in the baseband (0 to 138 kHz) and an image in the first band above the Nyquist frequency (138 kHz to 256 kHz) representing a complex conjugate of the baseband. Because the 64-point IFFT is upsampled for the filter h(k), two additional images are present in the following two bands (256 kHz to 414 kHz and 414 kHz to 552 kHz).

Referring to FIG. 6b, the spectrum of the 128-point IFFT illustrated in FIG. 1b is shown. In this particular example the 128 point IFFT does not use image regeneration. As shown in the diagram there is an image in the baseband (0 to 138 kHz). Also, since the 128-point IFFT operates at 552 kHz, an image representing the complex conjugate of the baseband is located in the upper band (414 kHz to 552 kHz). There are no images present in the intermediate bands (138 kHz to 256 kHz and 256 kHz to 414 kHz).

In the present embodiment, the transmitter informs the receiver whether or not transmit signal images, with periodicity equal to the clock of the standard-size IFFT, have been generated. The transmitter further informs the receiver of the size of the IFFT. If the images are periodic with the clock of the standard-size IFFt, then the receiver uses a standard-size IFFT for demodulation. Otherwise the receiver uses a larger size FFT in accordance with the size of the IFFT. Since the period of the standard-size IFFT is 276 kHz, the spectrum illustrated in FIG. 6a satisfies this condition, while the spectrum illustrated in FIG. 6b does not. Therefore, the receiver demodulates the received signal using a 64-point FFT for the case illustrated in FIG. 6a and demodulates the received signal using a 128-point FFT for the case illustrated in FIG. 6b. Ideally, in this latter case, the FFT size should match the IFFT size, even though in practice a double size FFT typically suffices.

In an alternate embodiment, the 128-point IFFT includes an image restorer. The image restorer adds the signal images missing in FIG. 6b so that the frequency spectrum resembles that illustrated in FIG. 6a. Even though a 128-point IFFT is used, it is still possible to demodulate the signal using a standard size FFT at the receiver. Therefore, if the transmitted spectrum resembles that illustrated in FIG. 6a, the receiver uses a standard size FFT, regardless of the size of the FFT.

In yet an alternate embodiment, only the first image above the Nyquist frequency is needed in order to sufficiently approximate the signal transmitted using a standard-size IFFT. Therefore, it is only necessary to exchange information about the first image above Nyquist frequency. As illustrated in FIG. 6a, the first image above the Nyquist frequency lies between 138 kHz and 276 kHz. In FIG. 6b, the first image above the Nyquist frequency lies between 276 kHz and 414 kHz. That portion of the spectrum is either zero filled or contains the complex conjugate image of the baseband signal. The case where the portion above the Nyquist frequency is zero filled implies that the transmitter uses a larger than standard-size IFFT and the IFFT does not use image restoring. Thus, the receiver uses a larger than standard-size FFT. As previously described, it is preferable that the size of the FFT corresponds to the size of the IFFT, but a FFT doubled in size would suffice.

The case where the portion above the Nyquist frequency comprises the complex conjugate image of the baseband signal implies that the transmitter uses a standard-size IFFT or a larger than standard-size IFFT and image restoring. Thus, the receiver uses a standard-size FFT.

As previously described, the required information is exchanged before the receiver equalizer is trained. Therefore, G.hs has been selected as the preferred option to exchange the information. A parameter block is used for indicating the type of transmit signal images above the Nyquist frequency. The parameter block comprises an octet of bits. Codepoints in the octet are structured as bits 6 to 3 indicating an N value, where N is the number of IFFT points, and bits 2 and 1 defining the transmit signal images above the Nyquist frequency. This structure is described in more detail as follows. Bits 6 to 3 are defined as n. That is, (b6b5b4b3)=n, where b6 is bit 6, b5 is bit 5, b4 is bit 4, and b3 is bit 3. If $1 \leq n \leq 15$, then $N=2^n$. Therefore, if the receiver needs to adjust the size of the FFT in accordance with the IFFT, it knows the size of the IFFT. If n=0, then N is not a power of 2. Although the use of an IFFT where N is not a power of 2 is discouraged, it is provided as an option. If n=0 the receiver preferably uses an FFT having an input N is a power of 2 closest to the IFFT size. In this case, an additional field may be required to transmit the size of the IFFT. If b2b1=01, where b2 is bit 2 and b1 is bit 1, then the complex conjugate of the baseband signal is present in the band above the Nyquist frequency and the receiver implements a standard-size FFT. If b2b1=10, then the band above the Nyquist frequency is zero filled and the receiver implements a N-size FFT. The case b2b1=00 is a special case, such as a less than standard-size IFFT is used at the transmitter. This case is generally discouraged but is provided as an option. The case b2b1=11 is reserved so that different vendors implementing the invention may implement proprietary techniques. The receiver reacts differently to this case depending on the vendor's implementation of the system.

Therefore, before data is exchanged between modems the receiver is made aware of how the transmitter is modulating the data. The receiver adapts to the transmitter if necessary, thereby reducing data rate loss and improving the overall operation of data transmission.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method for improving data transmission between a transmitter and a receiver in a Discrete Multitone (DMT) based Digital Subscriber Line (DSL) system, said transmitter including an Inverse Fourier Transform (IFT) for modulating said data and said receiver including a Fourier Transform (FT) for demodulating said data, said method comprising the steps of:
   a) determining, at said transmitter, whether or not a spectrum of said IFT output is periodic with a clock of a predefined standard-size IFT;
   b) communicating, before data transfer begins, a result of said determination from said transmitter to said receiver; and
   c) adapting, at said receiver, said FT if said determined spectrum is not periodic with said clock of said predefined standard-size IFT.

2. A method as defined in claim 1, wherein said FT is adapted by doubling a size of said FT.

3. A method as defined in claim 1, wherein said transmitter further communicates a size of said IFT to said receiver.

4. A method as defined in claim 3, wherein said FT is adapted by matching a size of said FT with said size of said IFT.

5. A method as defined in claim 1, wherein said communication occurs during handshaking between said transmitter and said receiver.

6. A method as defined in claim 1, wherein said IFT is an Inverse Fast Fourier Transform (IFFT).

7. A method as defined in claim 1, wherein said FT is a Fast Fourier Transform (FFT).

8. A system for improving data transmission in a Discrete Multitone (DMT) based Digital Subscriber Line (DSL) system, said system comprising:
   a) a transmitter including an Inverse Fourier Transform (IFT) for modulating said data, said transmitter for determining whether or not a spectrum of said IFT output is periodic with a clock of a predefined standard-size IFT and communicating, before data transfer begins, a result of said determination to said receiver; and
   b) a receiver including a Fourier Transform (FT) for demodulating said data, said receiver for adapting said FT if said determined spectrum is not periodic with said clock of said predefined standard-size IFT.

* * * * *